US006734887B2

(12) United States Patent
Field

(10) Patent No.: US 6,734,887 B2
(45) Date of Patent: May 11, 2004

(54) PROCESS FOR PRINTING A METALLIC SECURITY FEATURE ON IDENTIFICATION CARDS AND CARDS PRODUCED THEREFROM

(75) Inventor: Gary Field, Portsmouth, RI (US)

(73) Assignee: ZIH Corp., Hamilton (BM)

( * ) Notice: Subject to any disclaimer, the term of this patent is extended or adjusted under 35 U.S.C. 154(b) by 28 days.

(21) Appl. No.: 10/316,559

(22) Filed: Dec. 11, 2002

(65) Prior Publication Data

US 2003/0107638 A1 Jun. 12, 2003

Related U.S. Application Data

(60) Provisional application No. 60/339,178, filed on Dec. 11, 2001.

(51) Int. Cl.[7] .......................... B41J 2/315; G06K 19/06

(52) U.S. Cl. ....................................... 347/171; 235/494

(58) Field of Search ................................ 347/101, 171, 347/172–176; 400/120.02, 120.03, 120.04, 237, 240, 240.3, 240.4; 101/491; 235/494, 492, 488; 359/2, 1; 503/227; 283/113, 114, 72, 74, DIG. 901

(56) References Cited

U.S. PATENT DOCUMENTS

| | | | | | |
|---|---|---|---|---|---|
| 4,544,181 | A | | 10/1985 | Maurer et al. | 283/74 |
| 4,663,518 | A | | 5/1987 | Borror et al. | 235/487 |
| 4,869,946 | A | | 9/1989 | Clay | 428/167 |
| 4,913,504 | A | * | 4/1990 | Gallagher | 359/1 |
| 5,018,767 | A | | 5/1991 | Wicker | 283/67 |
| 5,122,813 | A | | 6/1992 | Lass et al. | 346/1.1 |
| 5,199,081 | A | | 3/1993 | Saito et al. | 382/2 |
| 5,354,097 | A | | 10/1994 | Tel | 283/72 |
| 5,380,044 | A | | 1/1995 | Aitkens et al. | 283/67 |
| 5,409,883 | A | * | 4/1995 | Larshus et al. | 503/227 |
| 5,492,370 | A | | 2/1996 | Chatwin et al. | 283/110 |
| 5,505,494 | A | | 4/1996 | Belluci et al. | 283/75 |
| 5,619,026 | A | | 4/1997 | Chou et al. | 235/462 |
| 5,646,388 | A | | 7/1997 | D'Entremont et al. | 235/380 |
| 5,668,874 | A | | 9/1997 | Kristol et al. | 380/23 |
| 5,688,738 | A | | 11/1997 | Lu | 503/227 |
| 5,735,550 | A | | 4/1998 | Hinkle | 283/108 |
| 5,757,521 | A | * | 5/1998 | Walters et al. | 359/2 |
| 5,760,384 | A | | 6/1998 | Itoh et al. | 235/468 |
| 5,787,186 | A | | 7/1998 | Schroeder | 382/115 |
| 5,820,971 | A | | 10/1998 | Kaule et al. | 428/209 |
| 5,869,822 | A | | 2/1999 | Meadows, II et al. | 235/380 |
| 5,873,305 | A | | 2/1999 | Dell'olmo | 101/32 |
| 5,880,760 | A | | 3/1999 | Desie et al. | 347/55 |
| 5,883,452 | A | | 3/1999 | Masuda | 235/380 |
| 5,886,334 | A | | 3/1999 | D'Entremont et al. | 235/380 |
| 5,950,179 | A | | 9/1999 | Buchanan et al. | 705/38 |
| 5,956,067 | A | | 9/1999 | Isono et al. | 347/176 |
| 5,992,891 | A | | 11/1999 | Dyball | 283/89 |
| 5,994,263 | A | | 11/1999 | Ohshima et al. | 503/227 |
| 5,999,280 | A | | 12/1999 | Huang | 359/2 |
| 6,001,771 | A | | 12/1999 | Nakano et al. | 503/227 |
| 6,010,068 | A | | 1/2000 | Bozzo | 235/380 |
| 6,030,474 | A | | 2/2000 | Isono et al. | 156/64 |
| 6,062,604 | A | | 5/2000 | Taylor et al. | 283/72 |
| 6,089,614 | A | | 7/2000 | Howland et al. | 283/91 |
| 6,110,864 | A | | 8/2000 | Lu | 503/227 |
| 6,119,940 | A | | 9/2000 | Klug | 235/462.04 |
| 6,182,894 | B1 | | 2/2001 | Hackett et al. | 235/380 |
| 6,202,933 | B1 | | 3/2001 | Poore et al. | 235/493 |
| 6,273,473 | B1 | | 8/2001 | Taylor et al. | 283/72 |
| 6,283,188 | B1 | | 9/2001 | Maynard et al. | 156/521 |
| 6,294,241 | B1 | | 9/2001 | Kaule et al. | 428/138 |
| 6,302,444 | B1 | | 10/2001 | Cobben | 283/72 |
| 6,318,758 | B1 | | 11/2001 | Stenzel et al. | 283/91 |
| 6,533,180 | B1 | * | 3/2003 | Wood | 235/494 |

* cited by examiner

*Primary Examiner*—K Feggins
(74) *Attorney, Agent, or Firm*—Barlow, Josephs & Holmes, Ltd.

(57) ABSTRACT

A thermal transfer printing process for making identification cards is provided. The process involves printing indicia onto a dye-receptive surface of a card substrate. A metallic dye is applied in precise registration with selected print indicia to form a metallic border along the edges of the indicia. The invention also includes identification cards produced by this process. The process can be used to produce cards such as licenses, employee badges, student cards, bank cards, and the like having unique security features.

18 Claims, 9 Drawing Sheets

PROCESS FOR PRINTING A METALLIC SECURITY FEATURE ON IDENTIFICATION CARDS AND CARDS PRODUCED THEREFROM

CROSS-REFERENCE TO RELATED APPLICATIONS

This application claims the benefit of U.S. Provisional Application No. 60/339,178 having a filing date of Dec. 11, 2001.

BACKGROUND OF THE INVENTION

The present invention generally relates to a process for printing identification cards such as driver's licenses and credit cards. Particularly, the invention involves using a thermal transfer printing process to produce a metallic security outline around selected indicia printed on the card. The invention also encompasses identification cards produced by this process.

In recent years, various agencies have issued more identification cards such as passports, visas, driver's licenses, credit cards, bank cards, security access cards, and the like. Along with the increased circulation of valid identification cards, there has been an increase in card tampering and forgery. These counterfeiting activities are sophisticated and it has become more difficult to detect falsified cards. The industry has attempted to address this problem by manufacturing new tamper-resistant cards in a number of ways.

For example, Chatwin et al., U.S. Pat. No. 5,492,370 discloses a method for making security articles such as passports, visas, vehicle license certificates, vehicle tax certificates, identity cards, and the like. The article comprises a plastic substrate having embossed sections that provide a holographic effect. A thin metallic coating is applied over the entire surface of the substrate. An indicia-receptive coating is then applied over the non-embossed sections of the substrate so that at least part of the holographic effect remains visible. The coating is printed with security indicia. A protective transparent lacquer then may be coated on the surface of the article.

Dell'olmo, U.S. Pat. No. 5,873,305 discloses a method for protecting pre-printed sheets of paper (for example, leaflets, stock certificates and bank notes) by impressing microengravings on all or some of the printed portions of the paper. The microengravings correspond to holograms or diffraction patterns and are produced by a hot embossing process. The microengravings remain permanently retained on the pre-printed portion of the document after the document has been cooled.

Kaule et al., U.S. Pat. No. 5,820,971 discloses a method for making a multi-layer identification card having a security element. A transfer embossing foil can be used to produce the security element. The transfer embossing foil comprises a carrier material having an embossed layer that is coated with a metallized reflective layer. The card substrate is coated with a reaction adhesive, and the embossed structure and metal layer are transferred and bonded to the substrate by this adhesive.

Other card-issuing agencies apply a transparent coating over the entire surface of the card to deter forgery and assist in detecting counterfeit cards. For example, identification cards are often printed using a thermal transfer dye-sublimation process. Three printing passes are used to apply three colored dyes, yellow, magenta, and cyan, in a specific pattern and print information on the surface of the card. A fourth pass applies a transparent coating that overlays the entire surface of the card. This clear outer coating is a protective coating that helps deter tampering with the printed information on the card. The coating provides the card with a durable and scratch-resistant finish. A security watermark can be applied on the protective coating in a random or predetermined pattern. For example, a state agency may issue a driver's license with the name of the state printed in a repeating pattern on the clear protective coating in such a manner that the printed information beneath the protective coating remains visible.

Although the foregoing systems may be somewhat effective in manufacturing tamper-resistant identification cards, there is a need for an improved system. It would be desirable to have a process that does not require complex multiple steps or special processing such as the holographic embossing of a material's surface. There is a need for a relatively simple process that a card-issuing agency can use at the time and place where the card is issued. The present invention provides such a process. The invention also encompasses the identification cards produced by the process.

SUMMARY OF THE INVENTION

The present invention relates to a process for thermal transfer printing an identification card to produce a metallic foil security feature on the card. The process comprises the steps of: a) providing a card substrate having a thermal transfer dye-receptive surface; b) providing a set thermal dye transfer panels including a metallic foil panel; c) printing indicia onto the dye-receptive surface; and d) printing a metallic border along the outside edges of selected printed indicia to form a metallic security outline around the selected indicia.

The metallic security outline is produced with such fine resolution around the selected feature that potential counterfeit printers would have a difficult time reproducing the feature with conventional thermal printing equipment.

The card substrate may be in the form of a sheet, film, continuous web, individual card or other material suitable for continuous printing processes. Suitable substrate materials include, for example, polyesters, vinyls, polyamides, polyolefins, polyacrylates, polyimides, polystyrenes, polysulfones, aramids, polycarbonates, and celluloses. The card substrate may be coated with a dye-receptive coating comprising a polymer selected from the group consisting of polyesters, vinyls, polyamides, polyolefins, polyacrylates, polyimides, polystyrenes, polycarbonates, celluloses, and mixtures thereof.

The indicia may be printed in a monochrome format for black and white images or text, or alternatively may be printed in a process color format for color images. The metallic foil transfer panel has been known in the art, and is sequenced within the thermal dye transfer media for sequential printing. A transparent, protective coating may be applied over the printed surface of the card to make the card durable and scratch-resistant.

This invention also encompasses identification cards produced by the above-described processes. For example, licenses and credit cards having selected printed indicia with a metallic border may be produced by this process.

It is noted that the preferred embodiment takes advantage of selective registration of the metallic foil so that only a selected portion of the indicia is provided with the metallic foil outline. This selected printing feature is important because it requires a highly accurate and expensive print engine to accurately align the pixels to achieve the desired effect without ghosting and fuzzy edge artifacts. While multiple pass thermal printing devices are available on the market, most available devices do not have the same accuracy of registration as would a specialized commercial identification card printer as contemplated in the invention. Printers having substrate transport mechanisms with this type of accuracy are very expensive and usually only available to card issuing authorities through specific vendors. Accordingly, the highly accurate placement of the metallic foil border is readily identifiable and serves as an inexpensive security feature. Lesser accurate thermal printing devices will tend to leave sloppy edges which readily detectible to someone familiar with the security feature.

Other objects, features and advantages of the invention shall become apparent as the description thereof proceeds when considered in connection with the accompanying illustrative drawings.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
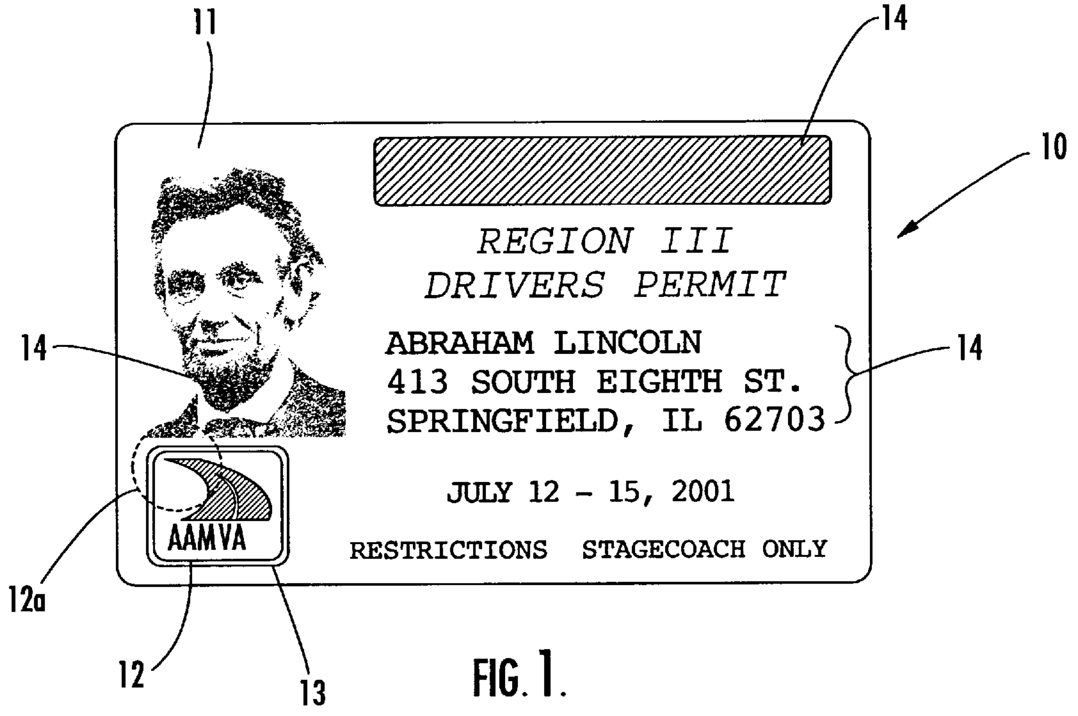
FIG. 1 is a planar view of an identification card produced in accordance with the present invention.

The present invention relates to a thermal transfer printing process for printing indicia on a substrate to form an identification card, and further relates to the resulting identification card as generally indicated at 10 in FIG. 1.

The printing process is a thermal dye sublimation printing process wherein thermal transfer dyes are printed onto a card substrate 11 to provide selected indicia 12 on the card substrate with a metallic security outline 13 while the remaining indicia 14 is not provided with the metallic security outline.

By the term, "identification card", it means any card-like means used to record or display information such as, for example, passports, visas, drivers licenses, employee badges, student cards, credit cards, bank cards, security access cards, and the like.

By the term, "indicia", it is meant any distinctive mark printed onto a card substrate, such indicia including, but not being limited to, alphabetic letters, numbers, symbols, patterns, lines, geometric shapes, images (for example, photographs), and any other characters.

In general, thermal transfer printing refers to a printing process, wherein thermally-transferable dyes are transferred from a dye sheet, generally indicated at 16 to a dye-receiving material (card substrate) 11, using a heating means (thermal printing head). The thermal dye is transferred to and absorbed by the card substrate 11 via a diffusion mechanism.

Examples of suitable dye-receiving card substrate materials include plain papers, synthetic papers, resin-impregnated papers, and films made from polyesters, vinyls (for example, polyvinyl chloride and polyvinyl acetate), polyamides, polyolefins (for example, polyethylene and polypropylene), polyacrylates, polyimides, polystyrenes, polysulfones, aramids, polycarbonates, celluloses, and other polymers. In the present invention, the dye-receiving card substrate 11 is preferably a PVC plastic material preformed into the shape of a card. However, other materials and pre-shaped articles are also contemplated.

The card substrate 11 may or may not be coated with a dye-receptive coating comprising any suitable resin. For example, polyester, polyamide, polyacrylate, polycarbonate, polyurethane, poly(vinyl acetal), poly(vinyl chloride), and polystyrene resins may be used as well as mixtures thereof.

Figure 2:
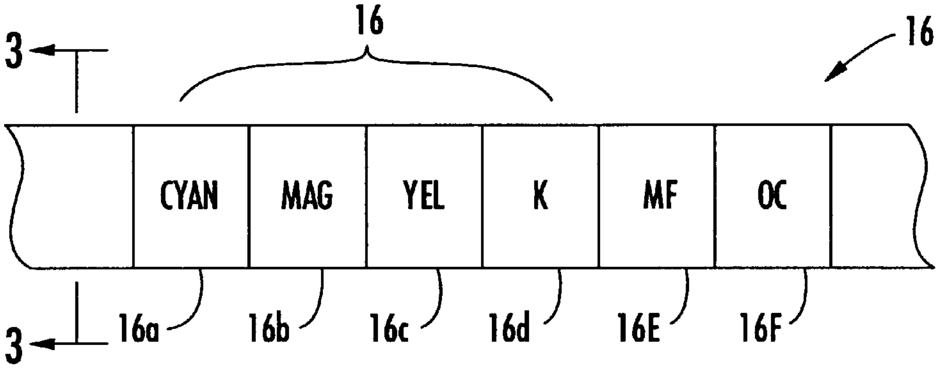
FIG. 2 is a planar view of a dye ribbon sheet showing different thermal dye panels used in accordance with the process of the present invention.
Figure 3:
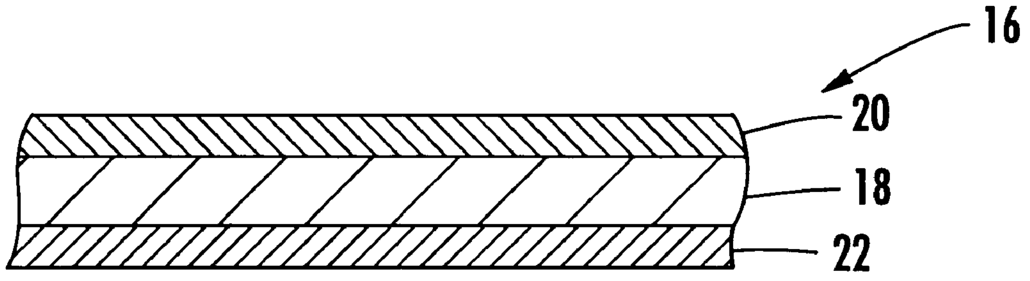
FIG. 3 is a cross-sectional view of the dye sheet used in accordance with the process of the present invention.

Referring to FIGS. 2 and 3, the dye sheet 16 is preferably in the form of a continuous ribbon with repeating panels of colored dyes (thermal printing ribbon). The ribbon 16 includes a continuous substrate 18, such as a paper or thermoplastic film. The substrate 18 has reasonably good dimensional stability and heat-resistance. Examples of suitable substrate materials for the dye substrate 18 include plain papers, synthetic papers, resin-impregnated papers, and films made from polyesters, vinyls, polystyrenes, polyolefins, polysulfones, aramids, polycarbonates, celluloses, and other polymers.

The dye substrate 18 is coated on its front surface with a transfer dye layer 20 comprising a thermally-transferable dye and binder resin. The preferred color dyes for the transfer dye layer 20 are yellow, magenta, and cyan colored dyes. In addition, a transfer dye layer 20 comprising a black dye can be made from a mixture of yellow, magenta, and cyan dyes. Suitable binder resins include, for example, cellulose, vinyl, acrylic, polyurethane, polyamide, and polyester resins. More particularly, ethyl cellulose, ethyl hydroxypropyl cellulose, methyl cellulose, poly(vinyl butyral), poly(vinyl acetal), and poly methacrylate resins can be used. The composition may include releasing agents and other additives.

Still referring to FIGS. 2 and 3, the dye sheet 16 has a continuous ribbon structure, wherein thermal dye panels of different colors, cyan C (16*a*), magenta M (16*b*), yellow Y (16*c*), are arranged in a repeating pattern along the length of the sheet. As mentioned above, the dye sheet 16 may optionally contain a black thermal dye panel K (16*d*) for monochrome printing on selected areas of the card 10. The panels 16*a*–16*d* may be arranged in an arbitrary order or in a specific sequence that repeats itself along the sheet. Typically, the colors are arranged in a CMYK color pattern as illustrated.

In accordance with the present invention, the thermal printing ribbon 16 further includes a metallic foil (metallic color dye) panel 16*e*. The metallic foil panel 16*e* is printed using the same thermal dye sublimation mechanism as the other thermal dye transfer panels. However, the pigment used in the metallic foil panel 16*e* is a metallic pigment rather than a conventional color pigment. Any color metallic pigment is suitable for the present invention. For purposes of specifying a preferred embodiment, the applicant notes that the most commonly used color is a gold metallic pigment. Metallic dye pigments of the type contemplated are known in the thermal printing arts, and no further description of the specific pigments or chemical make-up are believed to be necessary.

Further in accordance with the present invention, the thermal printing ribbon 16 optionally includes a sixth panel 16*f* (OC) comprising a transparent coating material. The transparent coating material 22 preferably comprises a resin selected from the group consisting of polyester, polystyrene, acrylics, polyurethane, polysiloxane, and mixtures thereof. This overlay coating 22 can be applied from a dye sheet panel 16. As shown in FIG. 2, the overlay coating panel 16*d* may be on the same ribbon dye sheet 10 containing the thermal dye panels 16*a*, 16*b*, and 16*c*.

Turning back to FIG. 3, the back surface of the dye sheet substrate 12 may also be coated with a back layer 22 to improve substrate feeding and heat-resistance properties. These coatings help prevent the substrate from sticking to a thermal printing head as discussed in further detail below. Suitable resins for the coated back layer 22 include, for example, silicones, fluorocarbons, and acrylics.

It is noted that the preferred embodiment takes advantage of selective registration of the metallic dye printing 13 so that only a selected portion of the indicia 12 is provided with the metallic dye outline 13. This selected printing feature is important because the combination of a multiple pass process color printing with a selectively printed security feature requires a highly accurate and expensive print engine to accurately align the pixels to achieve the desired effect without ghosting and fuzzy edge artifacts. While multiple pass thermal printing devices are available on the market, most available devices do not have the same accuracy of registration as would a specialized commercial identification card printer as contemplated in the invention. Printers having substrate transport mechanisms with this type of accuracy are very expensive and usually only available to card issuing authorities through specific vendors. Accordingly, the highly accurate placement of the pixels of the process color and the close proximity of the metallic dye border 13 is readily identifiable and serves as a unique security feature that can be applied using the existing process color print engines. Lesser accurate thermal printing devices will tend to leave sloppy edges which readily detectible to someone familiar with the security feature.

In the printing process, selected areas of the dye sheet 16 are heated to transfer the dyes 16*a*, 16*b*, 16*c*, 16*d* 16*e* and coating 16*f* in a desired pattern to the dye-receiving card substrate 11. The pattern is pre-determined and based upon electronic signals generated by a device, such as a computer, video camera, electronic still camera, and the like, that are sent to the thermal transfer printing equipment. The dyes 16*a*, 16*b*, 16*c*, and 16*d* are transferred to the dye-receiving card substrate 11 in a pattern corresponding to the areas of the dye sheet 16 that are heated. More specifically, referring to FIGS. 4–7, the thermal print heads used to heat the dye panel 16 are selectively instructed to turn on and off selected "dots" 24 or pixel elements on the print heads to transfer the dye. The result is that the dye is transferred pixel-by-pixel (dot-by-dot) onto the card substrate 11. Arrangement of the pixels 24 and color combinations determines the color and shape of the "indicia" 12, 14 visible on the card substrate 11. In the illustrated embodiments, process color pixels are indicated at 24*a* while the monochromatic metallic dye pixels are indicated at 24*b*.

Figure 5:
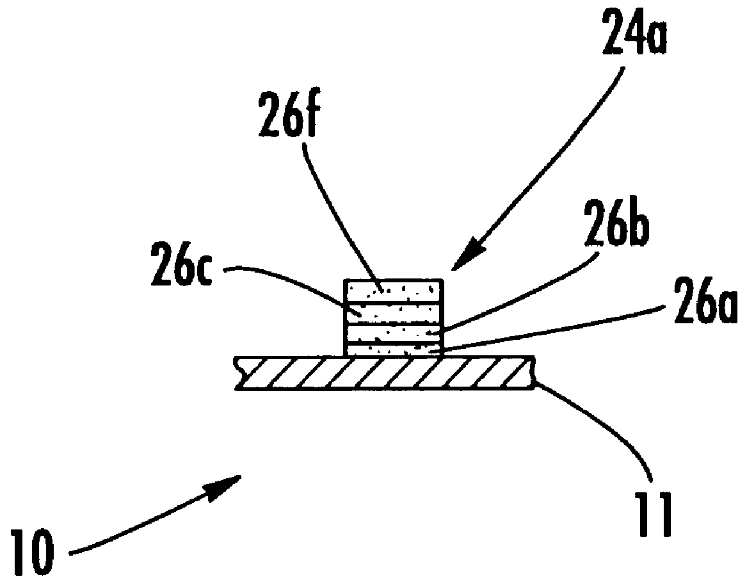
FIG. 5 is an enlarged cross-sectional view of a single printed pixel location showing overlay of the three colors of process printing and a fourth layer of the transparent coating.
Figure 6A:
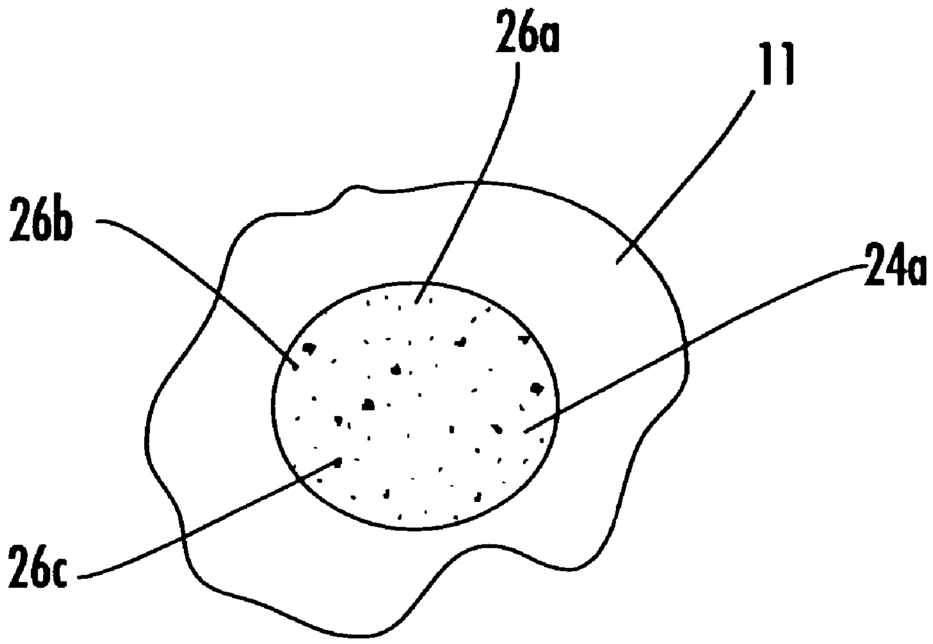
FIG. 6*a* is a top view of a single printed pixel showing precise overlapping pixel registration in accordance with the present invention.
Figure 6B:
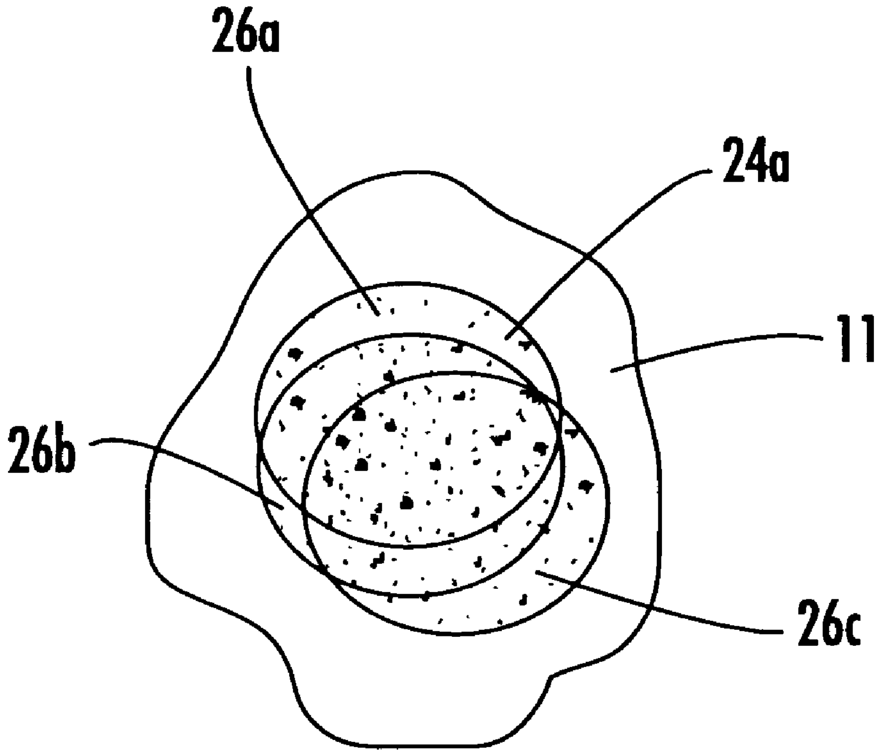
FIG. 6*b* is another top view of a single printed pixel showing the results of improper multi-pass pixel registration and the ghosting effect created around the peripheral edge thereof.

As discussed hereinabove, many agencies issue identification cards using a high quality "three pass" color thermal printing process to generate processed color prints on the card substrate. This process allows card issuing authorities to issue full process color cards over-the-counter. Referring to FIG. 5, during the printing process, a first thermal dye panel 16*a* is placed against the card substrate and passed over the thermal printing heads as the card substrate 11 is advanced. This heating action transfers the thermal dye from the panel 16*a* to produce a first colored print layer 26*a* on the card substrate 11. Other thermal dye panels 16*b* and 16*c* are applied in subsequent passes to produce print layers 26*b* and 26*c* and the resulting full-color pixel. For example, cyan (16*a*), magenta (16*b*), and yellow (16*c*) thermal dyes may be applied to the card substrate in three consecutive passes to form a processed color pixel 24*a* (See FIG. 5).

In cases where separate, black monochrome color is required or desired, such as for example when incorporating a bar code indicia onto the card, a fourth printing pass can be used to apply indicia using only the fourth black panel 16*d* (example not shown).

Still referring to FIGS. 4–7, there must be highly accurate registration between each pixel 24 printed onto the card in the first pass and each pixel 24 printed thereon in subsequent passes. In other words, each individual pixel of a given color that is printed onto the card in one pass must overlap exactly with a pixel printed onto the card during another pass so that the ultimate processed color does not have fuzzy edges or print artifacts (stray pixels). FIG. 5 is a cross-section of a single pixel 24*a* showing exact overlapping registration of each print layer 26*a*, 26*b*, 26*c* printed from each color panel 16. FIG. 6*a* is a top view of the same pixel 24 shown to have a consistent peripheral edge margin (full overlapping registration). However, FIG. 6*b* shows a pixel 24*a* wherein the individual color pixels 26*a*, 26*b*, and 26*c* as printed in each printing pass were not fully registered, causing an uneven peripheral outline (stray artifacts or ghosting depending on the degree of misregistration or colors used).

In the present invention, the thermal printer preferably uses three or four passes, as described above, to print selected indicia 12, 14 having a distinct processed color on the card substrate 11. In this preferred process, the dye layers 26 from each color overlay each other precisely to produce individuals pixels 24*a* of the indicia 12, 14 in a sharply defined processed color. FIG. 1 shows the identification card 10 printed in full color (color not shown) with selected indicia 12, 14.

Figure 4:
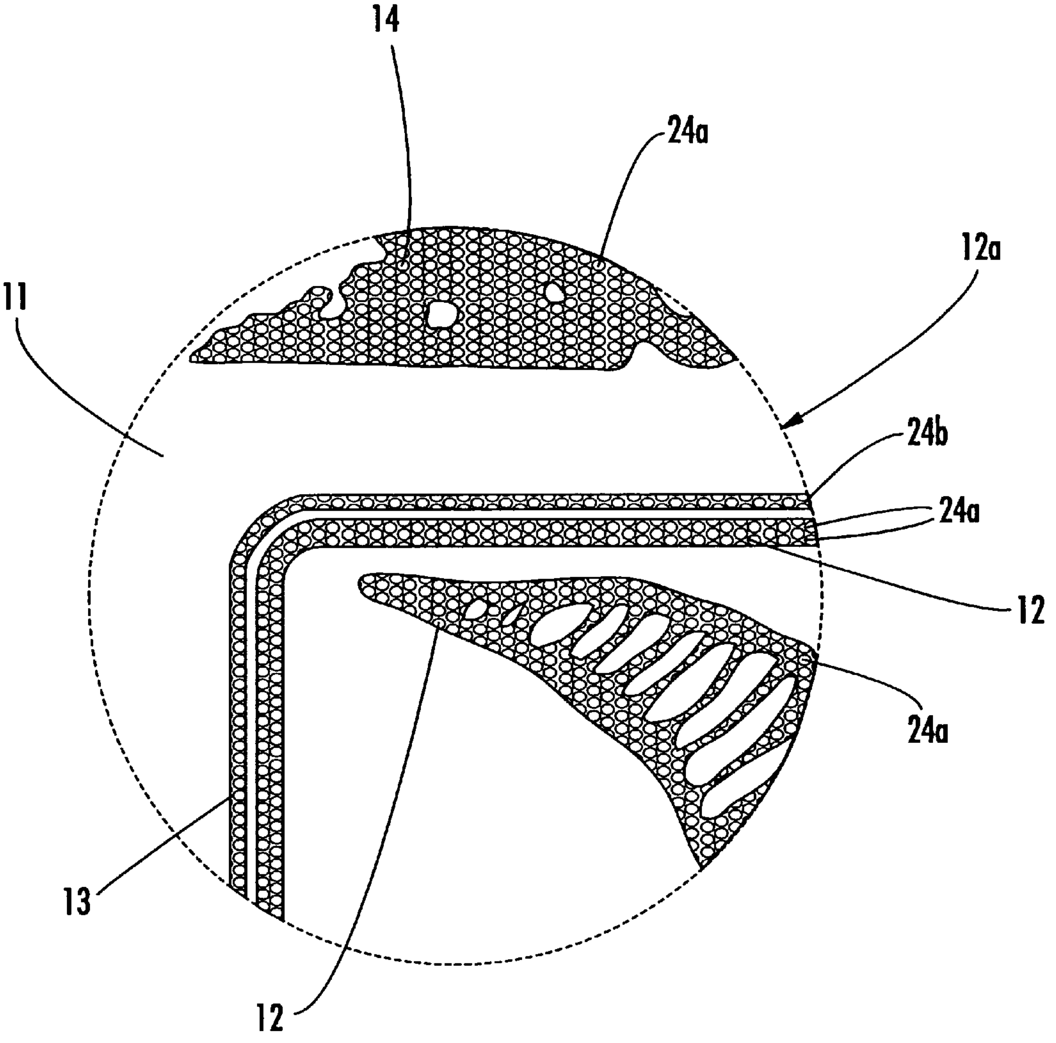
FIG. 4 is an enlarged view of the selected portion of the card provided with the metallic security outline, showing registration and alignment of the printing on a pixel-by-pixel level.
Figure 7A:
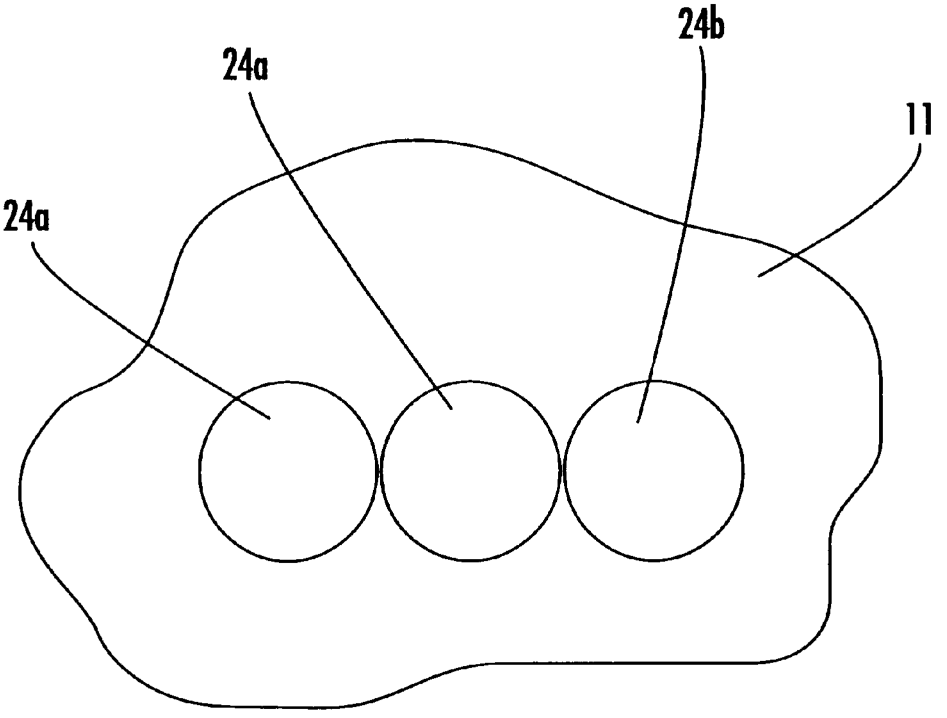
FIG. 7*a* is a top view of a trio of printed pixels showing precise overlapping pixel registration of the process color pixels and precise side-by-side registration of the metallic border pixel in accordance with the present invention.
Figure 7B:
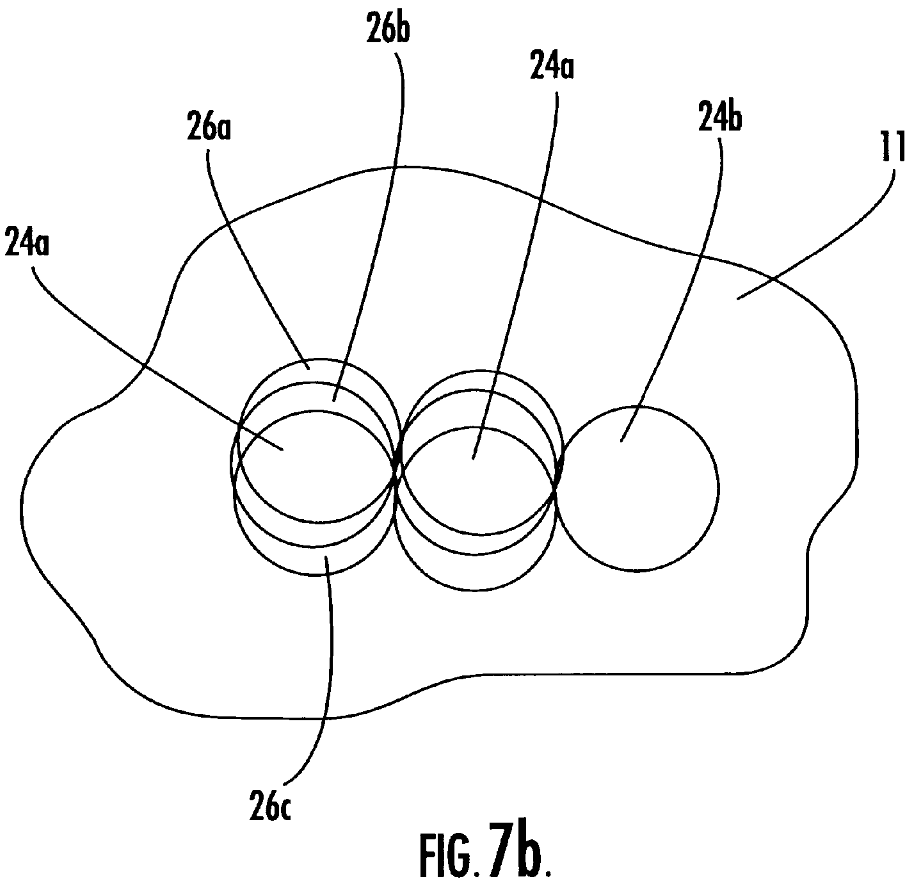
FIG. 7*b* is another top view of the same trio of printed pixels showing the results of improper multi-pass pixel registration and the ghosting effect created around the peripheral edges thereof.

Referring to FIG. 4, to produce the desired metallic security outline 13 around a selected "indicia" 12 of the card, dye from the metallic foil panel 16*e* is applied in exact pixel-by-pixel 24*b* registration with the pixels 24*a* of a selected printed "indicia" 12 to form a metallic security outline 13 that precisely outlines the indicia 12. As with the earlier printing passes, the dye from the metallic dye panel 16*e* is transferred in a separate printing pass. As indicated above, the selective registration of the pixels 24*b* of the metallic dye panel 16*e* provides only those selected pixels 24*b* with the desired metallic dye. FIG. 7*a* is a top view of a trio of side by side pixels 24*a* and 24*b* shown to have a consistent peripheral edge margin (full overlapping registration). However, FIG. 7*b* shows a trio of side-by side pixels 24*a* and 24*b* wherein the individual color pixels 26*a*, 26*b*, and 26*c* as printed in each printing pass were not fully registered, causing an uneven peripheral outline (stray artifacts or ghosting depending on the degree of misregistration or colors used). Likewise, misregistration could also cause overlapping of the metallic dye pixel 24*b* onto the process color pixels 24*a*, which would also be readily visible.

While it appears that the level of detail described herein may not be visible to the naked eye, these print misregistrations are visible using low magnification and can be readily identified by someone trained to notice such details. Accordingly, law enforcement authorities could be easily trained to identify cards which have been compromised, or falsely issued cards printed on inferior equipment.

Because printing of the metallic outline 13 can be selective, designers of the identification card can select which particular feature they desire to be outlined, such as for example, a logo on the card, as presently shown in the illustrated embodiment. The effect could also be applied to state seals, company names, or any other desired text, numbers, or sections of the card that are printed. Alternatively, the card designer may select an indicia 12 that may be prone to be altered to readily identify whether the card has been compromised. It is suggested that the birth date of the individual may be the most desirable indicia to provide with the outline effect as this is the most likely feature of the card to be altered. In this regard, a very narrow metallic security border could be printed around the peripheral edge of the birth date. Any physical alteration of the surface of the card to change the text would degrade or obliterate the metallic outline, immediately signaling an alteration of the card. Alternatively, the card issuing authority may randomly change the selected indicia at the time of printing so that unsuspecting forgers could not definitively identify which feature was supposed to be outlined.

In keeping with the intended concept of the invention, i.e. highly accurate pixel-by-pixel registration of process color printing and the metallic security outline, it is also contemplated that the selected indicia 12 on the card could be printed using a single color (black) or only one color of the process color, and outlined with the metallic border. Referring to FIG. 2, the selected indicia could be printed using a single panel of the ribbon, such as any one of the cyan 16*a*, magenta 16*b*, yellow 16*c*, or black 16*d* panels to create a single print layer. The indicia 12 could then be closely outlined with the metallic security border 13. The highly accurate thermal printing mechanisms could be programmed to lay down these printed pixels in such close registration that forgery with inferior equipment would be readily visible to a trained individual.

The process of the present invention provides cards having many advantageous features. First, the printed security feature is readily visible on the card, and alterations are easily identified.

Further, thermal transfer printing is a specialized art that employs complex printing equipment. In the present invention, the indicia is preferably printed in a processed color having high resolution and then a metallic border must be applied in exact registration with the selected print indicia. A counterfeiter who is not skilled in thermal transfer printing will face multiple difficulties in attempting to duplicate a card having these characteristics.

Even further still, most people do not have access to thermal printing equipment or thermal dye sheets containing a metallic pigment dye panel. A counterfeiter would need to be able to obtain the exact printing equipment and materials to independently reproduce a card having these features.

Thus, the process of this invention provides identification cards having unique and readily visible security features that cannot be easily reproduced.

It is appreciated by those skilled in the art that various changes and modifications can be made to the illustrated embodiments without departing from the spirit of the invention. All such modifications and changes are intended to be covered by the appended claims.

What is claimed is:

1. A process for thermal transfer printing an identification card, comprising the steps of:

a) providing a card substrate having a thermal transfer dye-receptive surface;

b) providing a thermal dye transfer ribbon having at least one color dye panel and a metallic dye panel;

c) printing indicia onto a selected portion of the dye-receptive surface with said color dye panel, and d) printing a metallic security outline onto a selected portion of the dye-receptive surface with said metallic dye panel, said metallic security outline being in registration with the printed indicia to form a metallic border along the edges of the printed indicia.

2. The process of claim 1, wherein the card substrate is in the form of a paper.

3. The process of claim 1, wherein the card substrate is in the form of a film.

4. The process of claim 3, wherein the film comprises a polymer selected from the group consisting of polyesters, vinyls polyamides, polyolefins, polyacrylates, polyimides, polystyrenes, polysulfones, aramids, polycarbonates, and celluloses.

5. The process of claim 1, wherein the surface of the card substrate is coated with a resin selected from the group consisting of polyesters, vinyls, polyamides, polyolefins, polyacrylates, polyimides, polystyrenes, polycarbonates, celluloses, and mixtures thereof.

6. The process of claim 1, wherein the indicia is printed in a black color.

7. The process of claim 1, wherein the indicia is printed in a non-black color.

8. The process of claim 1, wherein the indicia is printed in a color achieved from a combination of at least two dyes selected from the group consisting of yellow, magenta, cyan, and black dyes.

9. The process of claim 1, wherein the metallic border comprises a metal selected from the group consisting of gold, silver, aluminum, tin, zinc, titanium, chromium, and platinum.

10. The process of claim 1, wherein the metallic border is gold.

11. An identification card having printed indicia with a metallic border produced by a process, comprising the steps of:

a) providing a card substrate having a thermal transfer dye-receptive surface;

b) providing a thermal dye transfer ribbon having at least one color dye panel and a metallic dye panel;

c) printing indicia onto a selected portion of the dye-receptive surface with said color dye panel, and d) printing a metallic security outline onto a selected portion of the dye-receptive surface with said metallic dye panel, said metallic security outline being in registration with the printed indicia to form a metallic border along the edges of the printed indicia.

12. The identification card of claim 11, wherein the card is a license.

13. The identification card of claim 11, wherein the card is a credit card.

14. The identification card of claim 11, wherein the indicia is printed in a black color.

15. The identification card of claim 11, wherein the indicia is printed in a non-black color.

16. The identification card of claim 11, wherein the indicia is printed in a color achieved from a combination of at least two dyes selected from the group consisting of yellow, magenta, cyan, and black dyes.

17. The identification card of claim 11, wherein the metallic border comprises a metal selected from the group consisting of gold, silver, aluminum, tin, zinc, titanium, chromium, and platinum.

18. The identification card of claim 17, wherein the metallic border is gold.

* * * * *